United States Patent [19]

Birnbach et al.

[11] Patent Number: 4,854,669
[45] Date of Patent: Aug. 8, 1989

[54] OPTICAL IMAGE PROCESSOR WITH HIGHLY SELECTABLE MODULATION TRANSFER FUNCTION

[75] Inventors: Curtis Birnbach, Bronx; Fu Kuo Hsu, South Huntington, both of N.Y.

[73] Assignee: Quantum Diagnostics Ltd., Hauppauge, N.Y.

[21] Appl. No.: 211,218

[22] Filed: Jun. 17, 1988

Related U.S. Application Data

[63] Continuation of Ser. No. 19,648, Feb. 27, 1987, abandoned.

[51] Int. Cl.[4] .................. G02B 27/46; G02F 1/05; G06K 9/36
[52] U.S. Cl. ........................ 350/162.12; 350/356; 382/43
[58] Field of Search ............. 350/162.12, 356, 392; 382/43

[56] References Cited

U.S. PATENT DOCUMENTS

| | | | |
|---|---|---|---|
| 3,085,469 | 4/1963 | Carlson | 350/162.12 X |
| 3,309,162 | 3/1967 | Kosanke et al. | 350/356 |
| 3,370,268 | 2/1968 | Dobrin et al. | 350/162.12 X |
| 3,409,872 | 11/1968 | Hogg et al. | 350/162.12 X |
| 3,510,581 | 5/1970 | Craiglow et al. | 178/6 |
| 3,700,902 | 10/1972 | Buchan | 250/201 |
| 3,741,629 | 6/1973 | Kahn | 350/392 X |
| 3,955,208 | 5/1976 | Wick et al. | 350/336 X |
| 4,313,663 | 2/1982 | Stemme et al. | 350/336 X |
| 4,330,775 | 5/1982 | Iwamoto et al. | 340/146.3 P |
| 4,557,563 | 12/1985 | Sprague | 350/162.12 |
| 4,647,154 | 3/1987 | Birnbach et al. | 350/162.12 |

Primary Examiner—Rodney B. Bovernick
Assistant Examiner—David J. Edmondson
Attorney, Agent, or Firm—Ostrolenk, Faber, Gerb & Soffen

[57] ABSTRACT

An optical image processor utilizes a source of partially coherent light and a spatial filter with a highly selectable modulation transfer function for processing an image, which may be present in real time. The spatial filter contains electro-optic material with elctrodes arranged on such material to form a plurality of annular bands of different radii that are concentrically-situated and invididually-addressable. The annular bands are changeable in transmissivity in a continuous spectrum fro transparent to opaque in response to an electrical signal on the respective electrodes of the bands. A first optical transmission path receives the image to be processed and optically transmits the image to the spatial filter for processing. A second optical transmission path receives the image processed by the spatial filter and optically transmits the image to an output port. The first and second optical transmission paths may each contain a respective spatial light modulator, whereby, for example, gray scale operations can be performed on the image. Each of the first and second optical transmission paths may include a respective zoom lens, whereby the output image size may be adjusted during image processing without interfering with the operation of the spatial filter. The spatial filter may have a reflective backing on one side for system compactness.

20 Claims, 6 Drawing Sheets

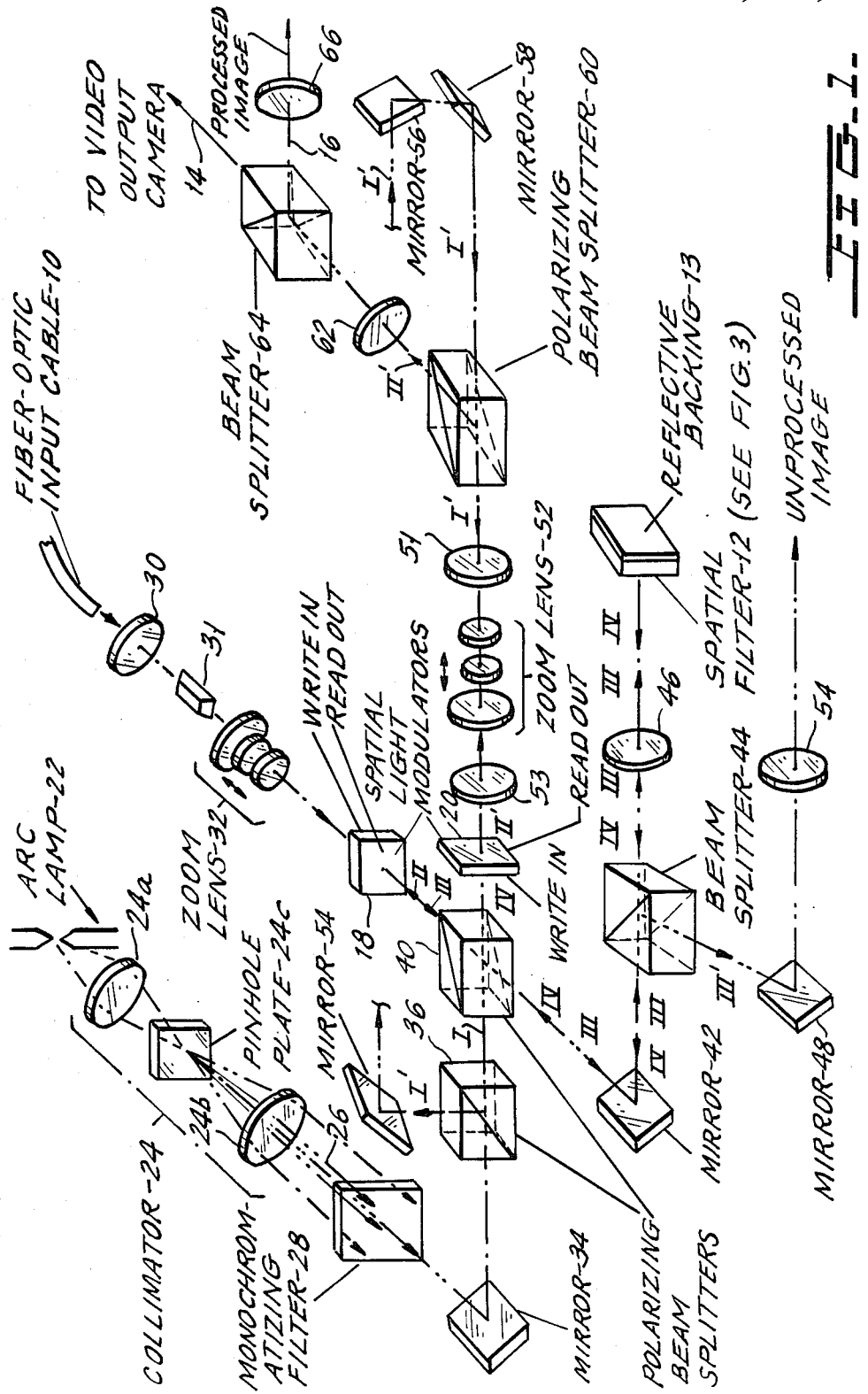

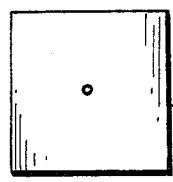 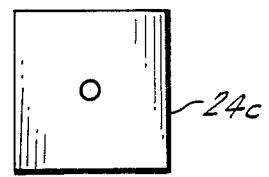
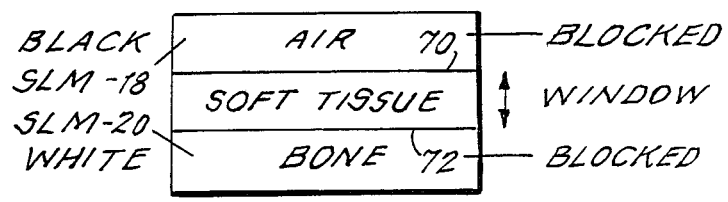
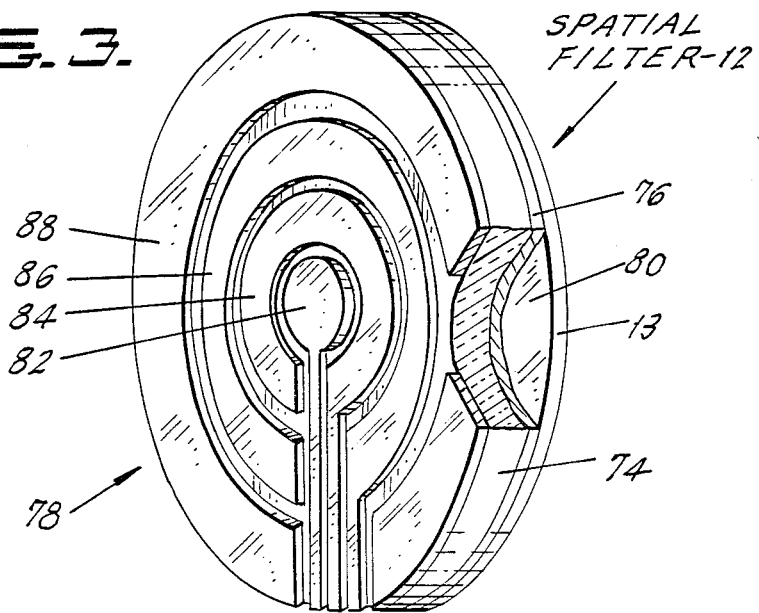

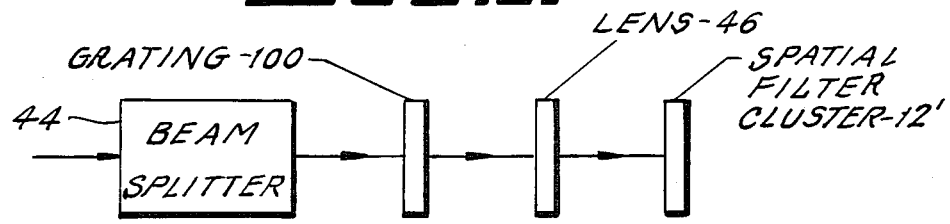
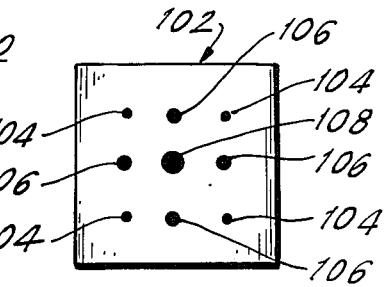
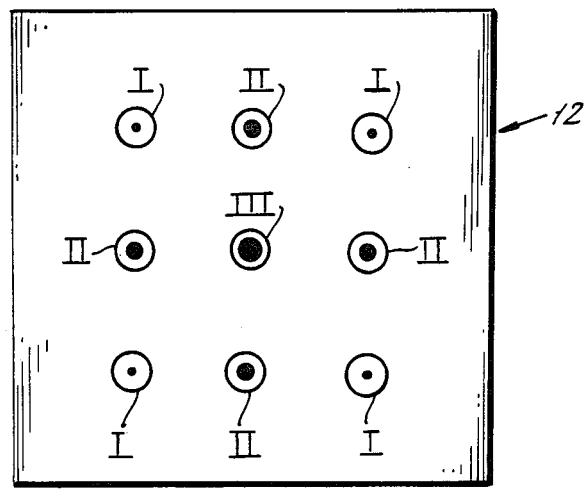

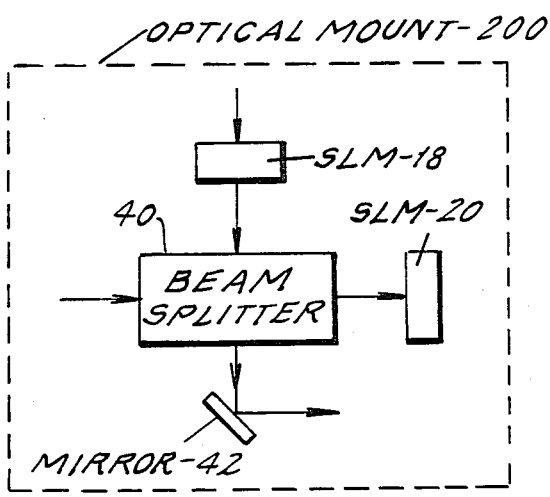
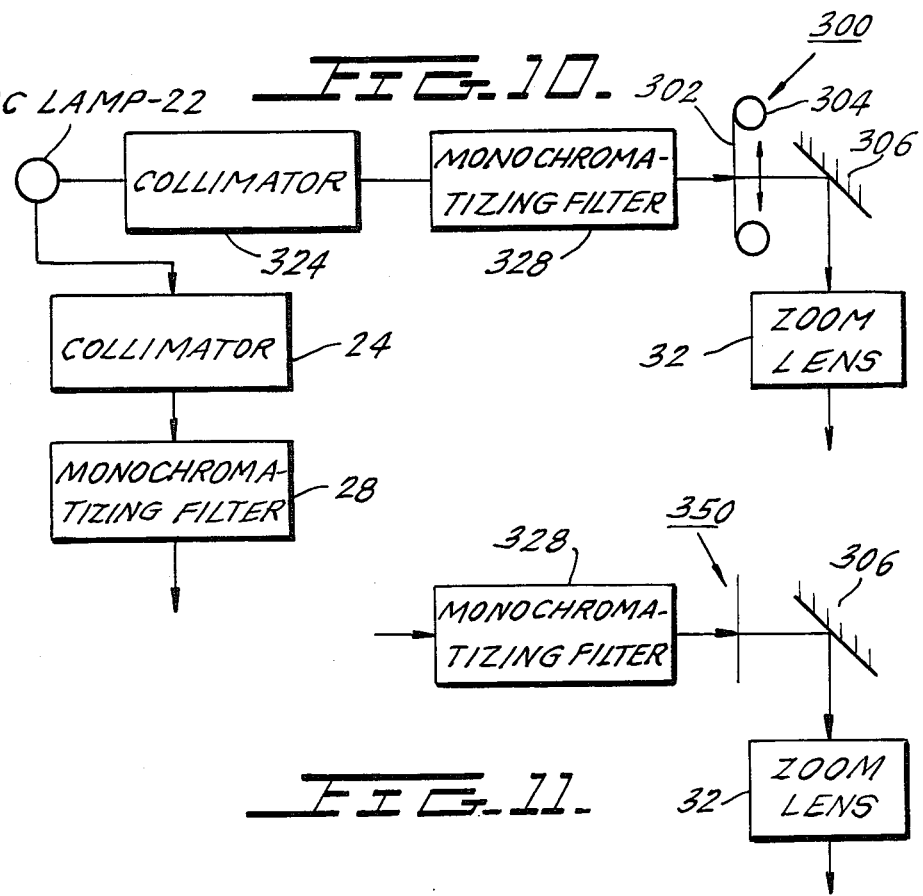

OPTICAL IMAGE PROCESSOR WITH HIGHLY SELECTABLE MODULATION TRANSFER FUNCTION

This is a continuation of application Ser. No. 19,648, filed Feb. 27, 1987, now abandoned.

BACKGROUND OF THE INVENTION

The present invention relates to an optical image processor, and more particularly, to an optical image processing system that is capable of providing a highly selectable modulation transfer function.

Typical image information desired to be processed includes real-time X-ray images of internal structures of human bodies. The X-ray images usually have information that is of particular interest, such as blood vessels in the heart, and much additional information that is of little or no interest to an observer, such as a person's rib cage or other bone structures. It would be desirable to process an optical image, such as just described, to eliminate much of the information that is not of interest. This, fortunately, is possible because the different types of material represented in an X-ray image typically have different spatial frequencies. Spatial frequencies are related to the size of objects in an image. Large objects have low spatial frequencies, and small objects have high spatial frequencies.

The degree of optical processing imparted to an image can be expressed in terms of the modulation transfer function of an optical system. One hundred percent modulation represents no change to an image, whereas zero percent modulation represents a complete blockage of all image information.

It would be desirable to provide an optical image processor having a modulation transfer function that is highly selectable. A desirable modulation transfer function of high selectability would be variable nearly continuously between zero and one hundred percent of spatial frequencies, and, further, would be capable of selectively passing a desired range or ranges of spatial frequencies while suppressing other frequencies. Such a system would desirably be compact and utilize a small number of components for economy.

SUMMARY AND OBJECTS OF THE INVENTION

It is, therefore, a principal object of the invention to provide an optical image processor having a modulation transfer function that is highly selectable.

A further object of the invention is to provide an optical image processor having a highly selectable modulation transfer function and that is compact and uses a minimal number of components.

Another object of the invention is to provide an optical image processor in which one or more ranges of spatial frequencies are transmitted while other frequencies are suppressed so that unwanted image information can be removed from an image.

Yet another object of the invention is to provide an optical image processor having a modulation transfer function that is variable nearly continuously between zero and one hundred percent.

The foregoing and other objects of the invention are attained in an optical image processor comprising first and second transmission means. The first transmission means receives an image to be processed and optically transmits the image along a first path to a spatial filter for processing. The second transmission means receives an image processed by the spatial filter and optically transmits the image along a second path to an output port. The spatial filter contains electro-optic material with electrodes arranged on such material to form a plurality of individually-addressable, concentrically-situated annular bands of different radii. The annular bands are capable of having their respective transmissivities changed in a continuous spectrum from transparent to opaque in response to an electrical signal on the respective electrodes of the bands.

BRIEF DESCRIPTION OF THE DRAWINGS

The above objects as well as other objects of this invention shall become readily apparent after reading the following description of the accompanying drawings in which:

FIG. 1 is a schematic, three-dimensional view of an optical image processor in accordance with the invention;

FIGS. 1A and 1B are detail views of alternative pinhole plates used in the optical system of FIG. 1;

FIG. 2 is a graphic illustration of a "windowing" function that can be performed by the image processor of FIG. 1;

FIG. 3 is a simplified, three-dimensional view of a spatial filter that may be used in the optical processor of FIG. 1;

FIG. 5 is a detail view of an embodiment of the invention in which a diffraction grating is used in conjunction with a cluster of spatial filters to achieve enhanced image processing;

FIG. 6 schematically shows a two-dimensional, sinusoidal grating used in the arrangement of FIG. 5;

FIG. 7 shows the diffraction pattern generated as a result of using the grating of FIG. 6;

FIG. 8 shows a clustered arrangement of spatial filters for use with the grating of FIG. 6;

FIG. 9 illustrates various components of the system of FIG. 1 that may be placed on a single optical mount;

FIG. 10 shows an embodiment of the invention in which input image data is supplied from cine film;

FIG. 11 shows a further embodiment of the system in which input image data is supplied from a stationary film;

DESCRIPTION OF THE PREFERRED EMBODIMENTS

Figure 4:
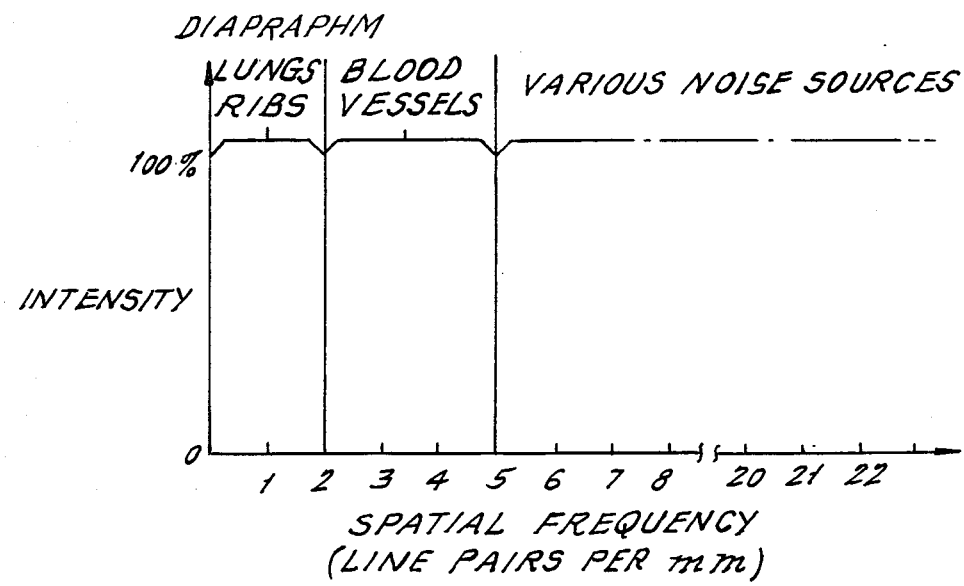
FIG. 4 is a graph illustrating the modulation transfer function of the spatial filter of FIG. 3.

FIG. 1 illustrates a preferred optical processing system in accordance with the invention. The system may include a fiber-optic input cable 10 which may include real-time image information such as provided from an X-ray source. Input information may be alternately provided by a cathode ray tube (not shown), for example. An image provided on input cable 10 is processed by spatial filter 12, which is located at a fourier plane, before being produced as a processed image on output lines 14 or 16. Spatial filter 12 is an important element of the present optical image processor. Details of construction and operation of spatial filter 12 will be described below.

The system of the invention preferably incorporates a pair of optically-addressed, two-dimensional spatial light modulators 18 and 20. As is known in the art, spatial light modulators of this type have an input or "write in" side on which input image information is "written" and an output or "read out" side on which output image information is then "read" Spatial light modulators 18 and 20 provide amplification of light intensity in the image beam being processed, and may provide other functions such as set forth below. An arc lamp 22 provides light for the system of the invention. Arc lamp 22 may be a 100 watt mercury lamp with a 0.25 mm arc size. The light from arc lamp 22 is directed onto the "read out" side of spatial light modulators 18 and 20 for amplification purposes.

The light provided from arc lamp 22 is collimated via a collimator 24 having lenses 24a, 24b and a pinhole plate 24c. Collimated light 26 emitted from collimator 24 is then passed through a monochromatizing filter 28, which may pass the green line from arc lamp 22. Monochromatizing filter 28 assures that the present system will have only one Fourier spectrum in focus at the Fourier plane.

In addition to collimating the light issuing from arc lamp 22, collimator 24 advantageously performs the further function of imparting a partial degree of coherence into the light exiting the collimator. "Partial" coherence is some degree of coherence between noncoherence and total coherence light (e.g., as in a laser). The degree of coherence of the light leaving collimator 24 is primarily determined by the size of the pinhole in glate 24c in conjunction with the size of the arc in arc lamp 22. The focal lengths of lenses 24a and 24b also have an effect on the degree of coherence in light leaving the collimator. The pinhole sizes may be varied as shown in the detail views of different pinhole plates 24c in FIGS. 1A and 1B.

If the degree of coherence of light leaving collimator 24 is excessive, undesirable artifacts may appear in the output image. A typical artifact is the creation of very sharp edges around structure in the image, such as around a blood vessel in the human body. If the degree of coherence of the light exiting collimator 24 is inadequate, the present system will perform little or no processing on the input image. The selection of a suitable degree of coherence for the system of the invention will, thus, necessarily require a compromise that a person of ordinary skill in the art will be capable of making in a routine manner.

Input image information provided by fiber-optic cable 10 typically has a low degree of coherency. The input information on cable 10 is written onto the "write in" surface of spatial light modulator 18. An output reflective pattern is generated on the "read out" side of modulator 18 corresponding to the input image. Since the read out side of modulator 18 is provided with partially coherent light, partial coherency is imparted to the image information to be processed.

Input image information from fiber-optic input cable 10 is amplified before reaching spatial filter 12 in the following manner. Light entering fiber-optic input cable 10 passes through an initializing lens 30, an image rotation prism 31, and a zoom lens 32 before reaching the "write in" surface of spatial light modulator 18.

Image rotation prism 31 provides a convenient way to rotate the image beam being processed. By "initializing" lens is meant an intermediate lens that initializes proper coupling between optical devices. Such coupling is needed because the size of the image beam being processed in the present system is typically larger than the size of the input image beam. Partially coherent light originating from arc lamp 22 reaches the "read out" surface of spatial light modulator 18 via the following elements: collimator 24, monochromatizing filter 28, mirror 34, a polarizing beam splitter 36, path (Roman numeral) I, and path II leaving polarizing beam splitter 40. The input image received by spatial light modulator 18 is "read out" as a reflective pattern (not shown) on the modulator such that a reflected beam III is produced and passes through polarizing beam splitter 40. The image beam III is then reflected by mirror 42 and passes through beam splitter 44, initializing lens 46, and spatial filter 12.

A portion of the light beam in path III is reflected by beam splitter 44 to path III'. The light in path III' is reflected off mirror 48 and through an initializing lens 54. The output of lens 54 is an image that is not processed by spatial filter 12.

On a back surface of spatial filter 12, a reflective coating 13 is preferably provided Reflective coating 13 redirects the image in path III back through spatial filter 12 along path IV. The details of the optical processing operations performed by spatial filter 12 on light beams III and IV are described below. The image in path IV then passes through initializing lens 46, and is transmitted straight through beam splitter 44 The image in path IV is reflected off mirror 42 and is then reflected to the right off the reflecting surface of polarizing beam splitter 40. Light beam IV then reaches the "write in" surface of spatial light modulator 20.

Light in path IV reaching the "write in" surface of spatial light modulator 20 is "written" into the modulator. This results in creation of a reflective pattern on the "read out" surface of the modulator representing the image in path IV. Part of the light originating from mirror 34 is directed to the "read out" surface of spatial light modulator 20 by diversion to path I' in polarizing beam splitter 36. The light directed along path I' is reflected by mirror 54 to the right in FIG. 1 and then to mirror 56, whereupon it is reflected downwardly to mirror 58. Mirror 58, in turn, reflects the light in path I' straight through polarizing beam splitter 60 and through initializing lens 51, zoom lens 52 and a further initializing lens 53 before reaching the "read out" surface of spatial light modulator 20. An amplified image is then reflected from the reflective pattern on the "read out" surface of spatial light modulator 20 to path II' via polarizing beam splitter 60. The image beam in path II' passes through initializing lens 62 to a beam splitter 64.

A significant feature of the present invention is the inclusion of a pair of zoom lenses 32 and 52 respectively located in the input path to spatial light modulator 12 and the output path from spatial light modulator 12. When image processing is desired, the zoom focal lengths of zoom lenses 32 and 52 are first adjusted. Thereafter, the zoom focal length of lens 32 is preferably left unchanged, because changing of such focal length would affect the spatial frequency distribution in spatial filter 12. The provision of an additional zoom lens 52 in the output path permits output image size to be adjusted at any subsequent time during processing without affecting the spatial frequency distribution of spatial filter 12.

Considerable compactness and economy in the optical processing system of the invention result from the use of spatial filter 12 with a reflective backing 13' in the manner set forth above This is because elements of the present optical system are utilized to a high degree. For example, initializing lens 46 and mirror 42 are used twice, and light beams I-to-II, III and IV all pass through polarizing beam splitter 40.

A further feature of the invention is the cooperative use of spatial light modulators 18 and 20. Modulators 18 and 20, for example, may be used as gray scale operators to perform various functions other than the image amplification functions described above. For example, spatial light modulators 18 and 20 may be used to perform a function known as "windowing", in which shades of gray above a first threshold level are blocked out from the image being processed by means of one modulator, and shades of gray below a lower, threshold level ring to FIG. 2, a chart with gray scale variation in the vertical direction is illustrated. Soft tissue is represented in a center band, which is assumed to be of interest. The image information in the center band is passed by spatial light modulator 18 and 20. At a higher grayness level, above a threshold level 70, air, for example, is represented as dark and assumed not to be of interest. All image information above level 70 is blocked by spatial light modulator 18. Below a lower threshold level 72, material that is illustrated with less grayness (or more whiteness), such as bone, is assumed not of interest. All image information below level 72 is blocked by spatial light modulator 20. Threshold level control of spatial light modulators 18 and 20 is achieved by biasing the substrate of each modulator with a d.c. voltage. The polarity of the bias for modulator 18 would be opposite that of modulator 20 to provide the "windowing" function shown in FIG. 2.

FIG. 3 illustrates in simplified form a spatial filter 12 that may be used in the optical system of FIG. 1. Spatial filter 12 comprises an opto-electric layer 74 having a large area transparent electrode 76 on a rear surface of such layer and a transparent conductor pattern 78 on the opposite or front surface of the opto-electric layer. Reflective layer 13 adjoins rear electrode 76 and reflects light (not shown) that impinges on spatial filter 12 from the left as viewed in FIG. 3. The reflected beam (not shown) then passes to the left through conductor 76, opto-electric layer 74, and conductor pattern 78. A suitable material for forming reflective layer 80 is silver backed with 3 to 4 microns of copper to prevent oxidation of the silver. A suitable material for the conductive layers 76 and 78 is indium tin oxide, and a suitable material for opto-electric layer 74 is single crystal PLZT (lead lanthanum zirconium titanate).

The front pattern 78 of spatial filter 12 comprises a center region 82 and concentric bands 84, 86 and 88. Actual devices, however, desirably employ at least about 10 to 15 annular bands of conductive material 78. The higher the number of bands, the more nearly continuous is the modulation transfer formation of the present system. Electrodes 82, 84 and 88 are individually addressable by respective electrical signals thereon. The use of single crystal PLZT as an opto-electrical material for layer 74 provides the desirable feature of being able to vary the transmissivity of opto-electrical layer 74 in a continuous fashion from highly transparent to highly opaque.

By having the capacity to individually address the electrode elements 82-86 of spatial filter 12, an operator can block, pass or partially transmit respective spatial frequency bands of the image to be processed Thus, for example, with reference to the spatial frequency graph of FIG. 4, an image could be processed by transmitting in full spatial frequencies of 2 through 5 lines pairs per mm representing blood vessels, while lower and higher frequencies are suppressed. The lower frequencies may represent, for example, lungs, ribs or a diaphragm, whereas the higher frequencies may represent various noise sources. Further details of spatial filter 12 and variations of such filter may be found by reference to copending and commonly assigned application serial number (M-10696 (505-40)), filed on Dec, 3, 1986, and entitled "Electrically Programmable Fourier Domain Optical Processing Element", in the name of Curtis Birnbach, one of the present inventors. The entire disclosure of the foregoing application is incorporated herein by reference.

FIG. 5 shows a modification of the optical system of FIG. 1 in which a grating 100 is placed between beam splitter 44 and initializing lens 46 in the input path to a spatial filter cluster 12' described below. Filter cluster 12' preferably has a reflective backing (not shown), similar to backing 13 in FIG. 3. Grating 100 can be placed anywhere along the image path between parts 44 and 46 since the light in this region is collimated.

The use of grating 100 causes a diffraction pattern of the input image to appear at the Fourier plane where spatial filter cluster 12' is located. When grating 100 has the two-dimensional sinusoidal pattern shown in simplified form in FIG. 6, the diffraction pattern 102 shown in FIG. 7 is produced on the spatial filter 12'. In pattern 102, the following points are produced: zero order points 104; first order points 106, with intensity an order of magnitude higher than zero order points 104; and second order points 108, with intensity an order magnitude higher than second order point 106.

FIG. 8 is a detail view of spatial filter cluster 12' of FIG. 5. Cluster 12' includes a plurality of spatial filters at locations I, II and III, which correspond exactly to locations 104, 106 and 108, respectively, in diffraction pattern 102 of FIG. 7. To achieve balanced processing of the image data at the various locations I, II and III, spatial filters such as that shown in FIG. 3 are stacked three high on location III and two high on location II. Only one spatial filter is used on location I.

FIG. 9 schematically illustrates an optical mount 200 on which selected components of the system of FIG. 1 are mounted. These components are spatial light modulators 18 and 20, polarizing beam splitter 40 and mirror 42. By placing spatial light modulator 20 on mount 200 put not the remaining output path components, the Fourier transfer elements shown in FIG. 9 are isolated from such output components. This is important because the Fourier transfer elements require particularly accurate adjustment and, by being on common mount 200, they can be adjusted as a unit before placement into the overall image processing system.

FIG. 10 illustrates an image source 300 that can be used in the system of FIG. 1 in place of fiber-optic input cable 10. Image source 300 comprises a cine film 302 and transport mechanism 304 for movement of film 302 up or down as indicated by the arrow. In accordance with an aspect of this invention, arc lamp 22 supplies light to cine film 302 via collimator 324 and monochromatizing filter 328. These elements 324 and 328 are of like construction to collimator 24 and filter 28, which are also supplied with light by arc lamp 22. Arc lamp 22, thus, is multiply used. The image information read off cine film 302 is then directed to zoom lens 32 by a mirror 306.

In FIG. 11, a stationary film 350 is used as an input image source and, like cine film 302 in FIG. 10, is illuminated by a second light path from arc lamp 22 (not shown) via monochromatizing filter 328.

Figure 12:
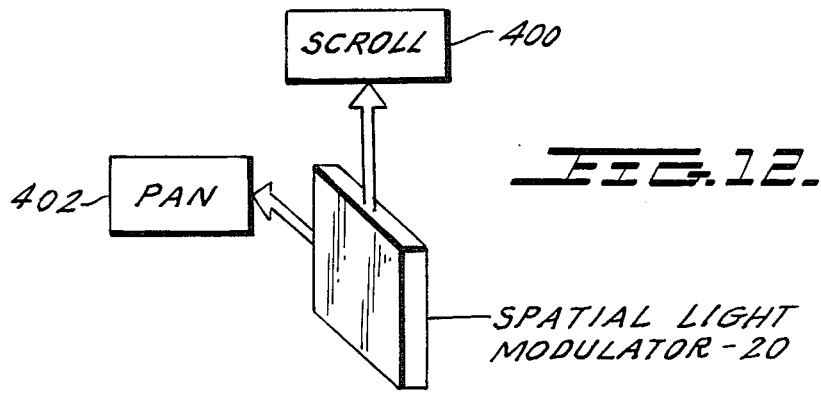
FIG. 12 is a block diagram representation of scroll and pan means associated with a spatial light modulator for imparting vertical and horizontal movement to the spatial light modulator.

A further advantage of including spatial light modulator 20 in the output path of the present system is to be able to provide a pan/scroll function so that the output image beam can be moved up and down and sideways as desired. FIG. 12 schematically illustrates scroll means 400 and pan means 402, which accomplish these functions.

Figure 13:
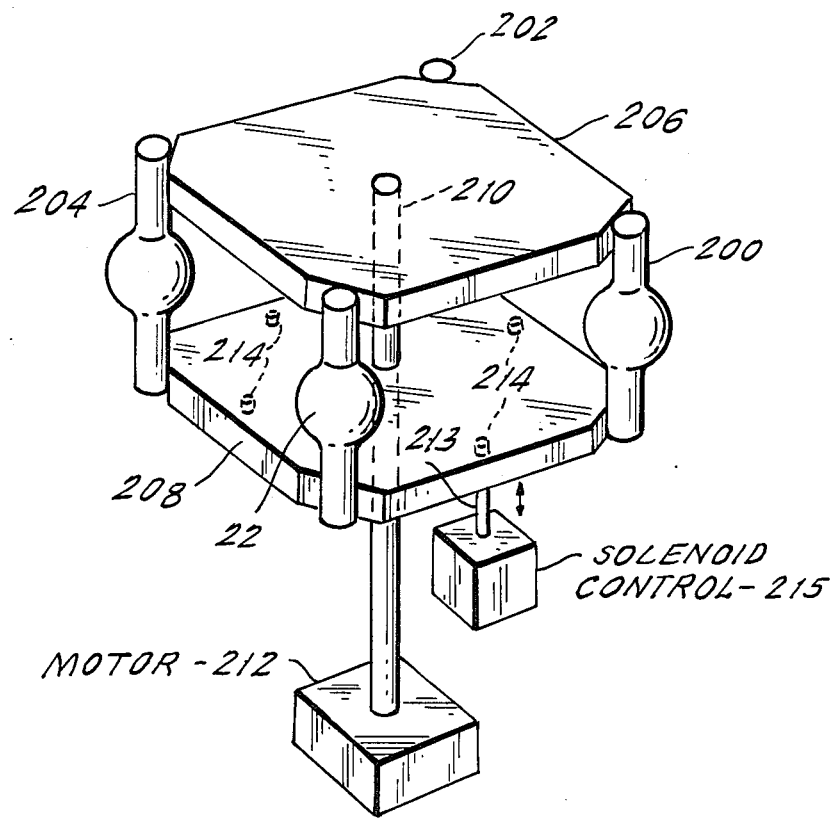
FIG. 13 is a simplified, three-dimensional view of a rotable carousel of arc lamps in accordance with an aspect of the invention.

FIG. 13 shows an array of redundant arc lamps 22, 200, 202 and 204, which may be provided to reduce system downtime in the event of lamp failure. These arc lamps are supported by a carousel 206, 208. A shaft 210 passes through carousel parts 206 and 208 and is selectively rotated by a motor 212. Carousel parts 206 and 208 may be of machinable ceramic, for example, such as lithium alumina silicate. Shaft 210 may be of steel, for example. A register pin 213 is received into a respective one of apertures 214 on the bottom of carousel part 208. Pin 213 latches carousel 206, 208 into position and is inserted into an aperture 214 by solenoid control 215.

Figure 14:
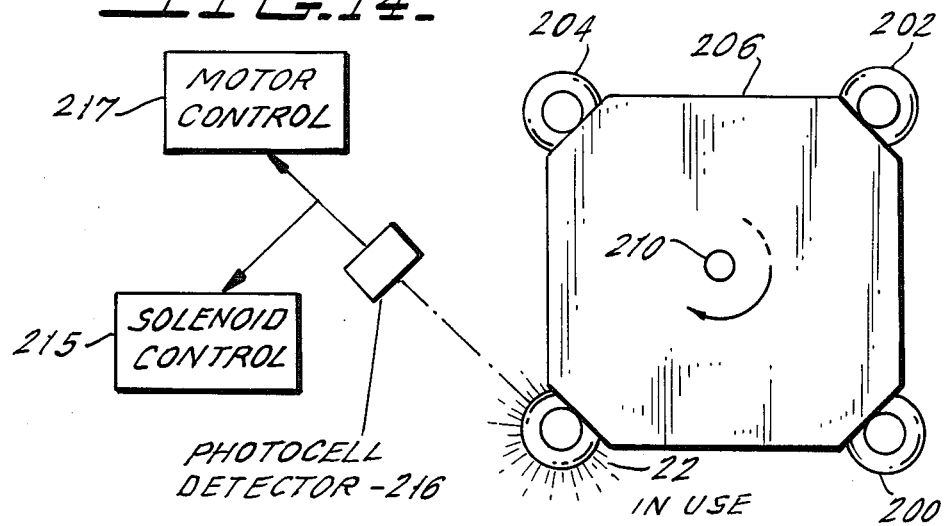
FIG. 14 is an upper plan view of a system for rotating the carousel of FIG. 14 when an arc lamp in use fails.

An operating system for carousel 206, 208 is illustrated in FIG. 14. Arc lamp 22 in FIG. 14 is in a "use" position, such as illustrated in FIG. 1. A photocell detector 216 monitors arc lamp 22 and applies an output signal to solenoid control 215 and a motor control 217 when lamp 22 fails. Solenoid control 215 retracts pin 213 (FIG. 13) from aperture 214, and motor control 216, which may be readily constructed by those of ordinary skill in the art, causes motor 212 to rotate carousel 206, 208 by 90° clockwise, for example, as viewed in FIG. 14. Solenoid control then inserts pin 213 into another aperture 214 to latch the carousel in place. Arc lamp 200 is then in the use position, and system downtime due to lamp failure is reduced to a minimum.

Preferred focal lengths and f stops for various lenses used in the system of FIG. 1 are as follows: lens 30—50 mm and f0.7; zoom lens 32—80-200 mm and f4.0; lens 46—192 mm and f4.0; lens 51—105 pl mm and f2.5; lens 54—240 mm and f4.0; zoom lens 52—80-200 mm and f4.0; lens 53—192 mm mm and f4.0; lens 62—140 mm and f4:0; and lens 66—300 mm and f5.6. Prism 31 may be of the known dove type, formed of solid glass, as shown, or a collection of mirrors as known in the art. Alternatively , by way of example, prism 31 can be of the known two-element pechan type. All polarizing and non-polarizing beam splitters shown in FIG. 1 except for beam splitter 36 preferably provide for equal intensity output beams. Beam splitter 36 preferably provides ninety (90) percent of its output on path I and ten (10) percent on path I'.

The foregoing describes an optical image processor having a highly selectable modulation transfer function that is variable nearly continuously between zero and one hundred percent. In the processor, one or more ranges of spatial frequencies can be passed while others are suppressed. In this way, noise, or unwanted image information can be removed from an image. The image processor is compact and uses a small number of components.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is;

1. An optical image processor comprising:
input means for providing an image to be processed.
first transmission means for receiving an image beam, imparting partial coherence to the image beam, and optically transmitting the image beam along a first path to a spatial filter for processing; and second transmission means for receiving an image beam processed by said spatial filter and optically transmitting the image beam along a second path to an output port;

said spatial filter containing a layer of electro-optic material with electrodes arranged thereon to form a plurality of individually-addressable, concentric annular bands of different radii, said annular bands being selectively changeable in transmissivity in a continuous spectrum from transparent to opaque in response to an electrical signal on the respective electrodes of the bands.

2. The image processor of claim 1, wherein said first transmission means includes a first spatial light modulator in the first path for receiving and amplifying an image beam to be processed.

3. The image processor of claim 2, wherein said second transmission means includes a second spatial light modulator in the second path for receiving the processed image and transmitting to the output port an image processed by the first and second spatial light modulators, whereby the first and second spatial light modulators can cooperatively interact, for example, to process the image beam by blocking gray values above an upper threshold and those below a lower threshold.

4. The image processor of claim 3, further including an optical mount and wherein:
said second transmission means includes a zoom lens in the second path; and
said first and second spatial light modulators are mounted on said optical mount; said zoom lens being isolated from said optical mount, whereby second first and second spatial light modulators are isolated from said zoom lens.

5. The image processor of claim 2, wherein said first transmission means includes a first zoom lens in the first path and said second transmission means includes a second zoom lens in the second path, whereby adjustment of the second zoom lens changes the size of the output image beam without changing any interaction between the first zoo lens and the spatial filter.

6. The image processor of claim 1, wherein said second transmission means includes a spatial light modulator in the second path for receiving and amplifying said processed image beam before it reaches the output port.

7. The image processor of claim 1, wherein said first transmission means includes:
a spatial light modulator in the first path for receiving the image beam to be processed and producing an output pattern with reflectively varying in correspondence with the image received;
a source of collimated and monochromatic light; and means to direct said collimated and monochromatic light onto the reflective output pattern of said spatial light modulator, whereby the light reflected off said pattern is higher in intensity than the image received by the spatial light modulator.

8. The image processor of claim 1, wherein said spatial filer has an input surface for receiving an image beam from said first transmission means, and includes a reflective material situated on an opposite surface of the spatial filter and oriented to reflect the image beam back through the spatial filter, whereby the first and second paths are coincident over at least a portion of their respective lengths.

9. The image processor of claim 1, wherein said input means comprises photographic film and a source of collimated and monochromatized light for illuminating said film.

10. The image processor of claim 9, wherein said film is cine film.

11. The image processor of claim 9, wherein:
said source of collimated and monochromatized light comprises an arc lamp, a first collimator and a first monochromatizing filter; and
said first transmission means includes a second collimator, a second monochromatizing filter supplied with light by said arc lamp, a spatial light modulator in the first path for receiving the image beam to be processed and producing an output pattern with reflectivity varying in conformity with the image received and means to direct light from said second collimator and said second monochromatizing filter onto the reflective output pattern of said spatial light modulator to produce an amplified image beam;
whereby said arc lamp is used for multiple purposes.

12. The image processor of claim 1, wherein:
said first transmission means includes a grating situated prior to said spatial filter in the first path and producing a diffraction pattern at a Fourier plane; and
said spatial filter is accompanied by a plurality of like spatial filters respectively arrayed to receive image information in the diffraction pattern.

13. The image processor of claim 12, wherein at least two of said spatial filters are stacked on each other to provide a balanced processing arrangement for points in said diffraction pattern of different order.

14. The image processor of claim 12, wherein said grating comprises a two-dimensional sinusoidal grating and three of said spatial filters are stacked on each other in positions corresponding to a zero order point of said diffraction pattern, two of said spatial filters are stacked in positions corresponding to first order points of said diffraction pattern; and a single spatial filter is placed in a position corresponding to second order points of said diffraction pattern.

15. The image processor of claim 14, wherein said first transmission means includes a source of collimated and monochromatized light, and amplifying means to intensify an image beam in the first path, said means supplied with light by said light source.

16. The image processor of claim 14, wherein said first and second transmission means commonly share a polarizing beam splitter receiving and reflecting by 90° light from said first light source into the first path in a direction away from said spatial filter and towards said amplifying means for intensifying the input image beam, while passing without reflection on an amplified image beam in the first path traveling toward said spatial filter, and receiving and reflecting by 90° an image beam processed by said spatial filter and directing said processed beam towards said output port, whereby multiple use of said polarizing beam splitter reduces processor size.

17. The image processor of claim 1, wherein said first transmission means includes an image rotation prism to permit rotation of the image beam.

18. The image processor of claim 1, wherein said first transmission means comprises a source of collimated and monochromatic light, said light source including an array of redundant lamps mounted on a carousel, a sensor to detect the failure of a lamp in use, a motor means responsive to said sensor for moving another of said redundant lamps into the position occupied by said lamp in use when said sensor detects failure of said lamp in use, and a means responsive to said sensor for latching said array of redundant lamps in position except when said sensor detects a failed lamp.

19. The image processor of claim 18, wherein said redundant lamps comprise arc lamps.

20. The image processor of claim 18, wherein said latching means comprises a register pin for being received in a respective one of a plurality of apertures in a part of said carousel.

* * * * *

UNITED STATES PATENT AND TRADEMARK OFFICE
CERTIFICATE OF CORRECTION

PATENT NO. : 4,854,669

DATED : August 8, 1989

INVENTOR(S) : Curtis Birnbach, Fu Kuo Hsu

It is certified that error appears in the above-identified patent and that said Letters Patent is hereby corrected as shown below:

Column 7, line 46, delete "pl".

Column 8, line 10, "." should read --;--.

Signed and Sealed this

Nineteenth Day of June, 1990

Attest:

HARRY F. MANBECK, JR.

*Attesting Officer*  *Commissioner of Patents and Trademarks*